Jan. 10, 1961 F. PETTIT 2,967,706
TOY AIRCRAFT AND CONTROL THEREFOR
Filed June 6, 1957 2 Sheets-Sheet 1
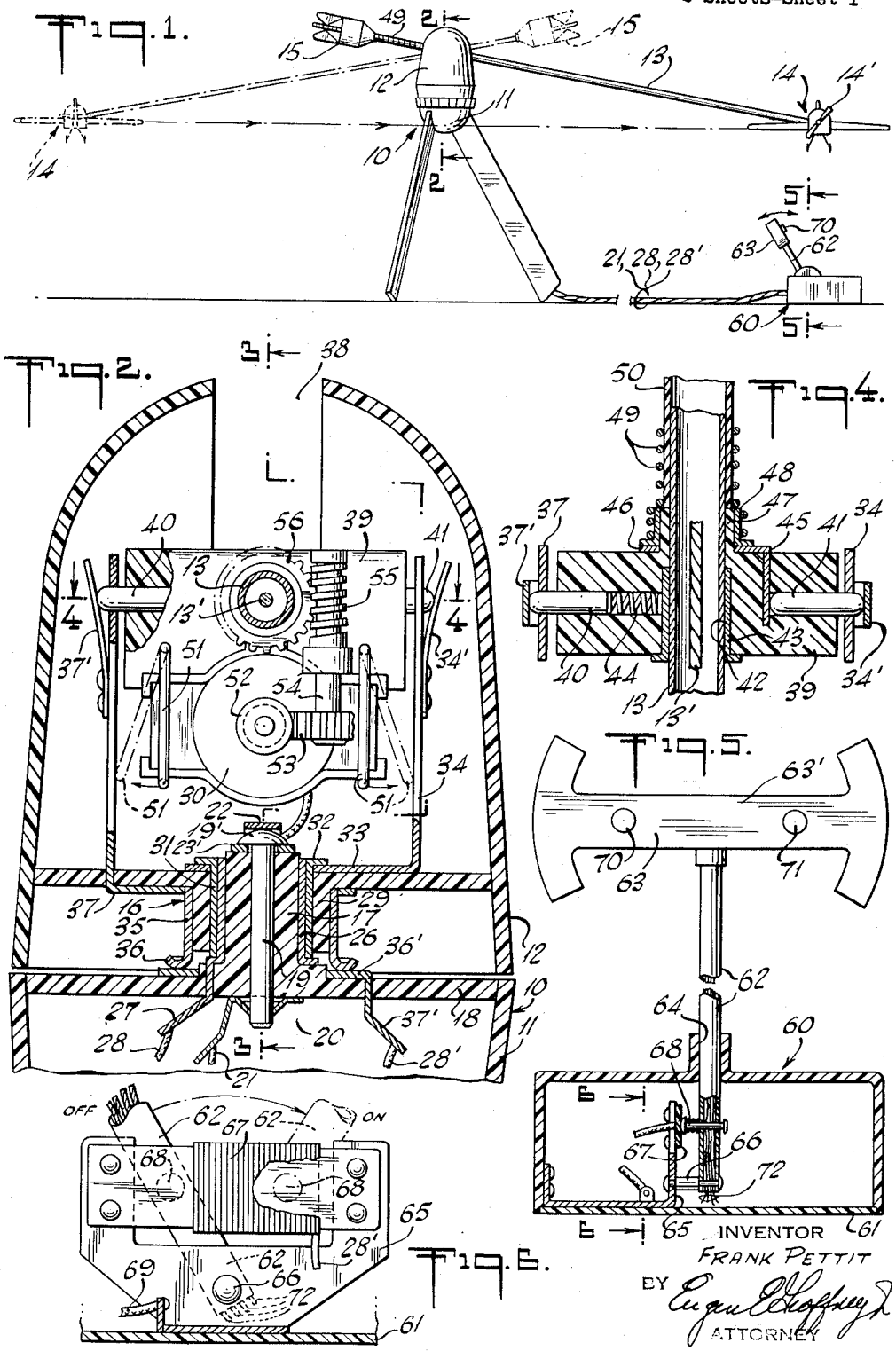
INVENTOR
FRANK PETTIT
BY
ATTORNEY Jan. 10, 1961  F. PETTIT  2,967,706
TOY AIRCRAFT AND CONTROL THEREFOR
Filed June 6, 1957  2 Sheets-Sheet 2
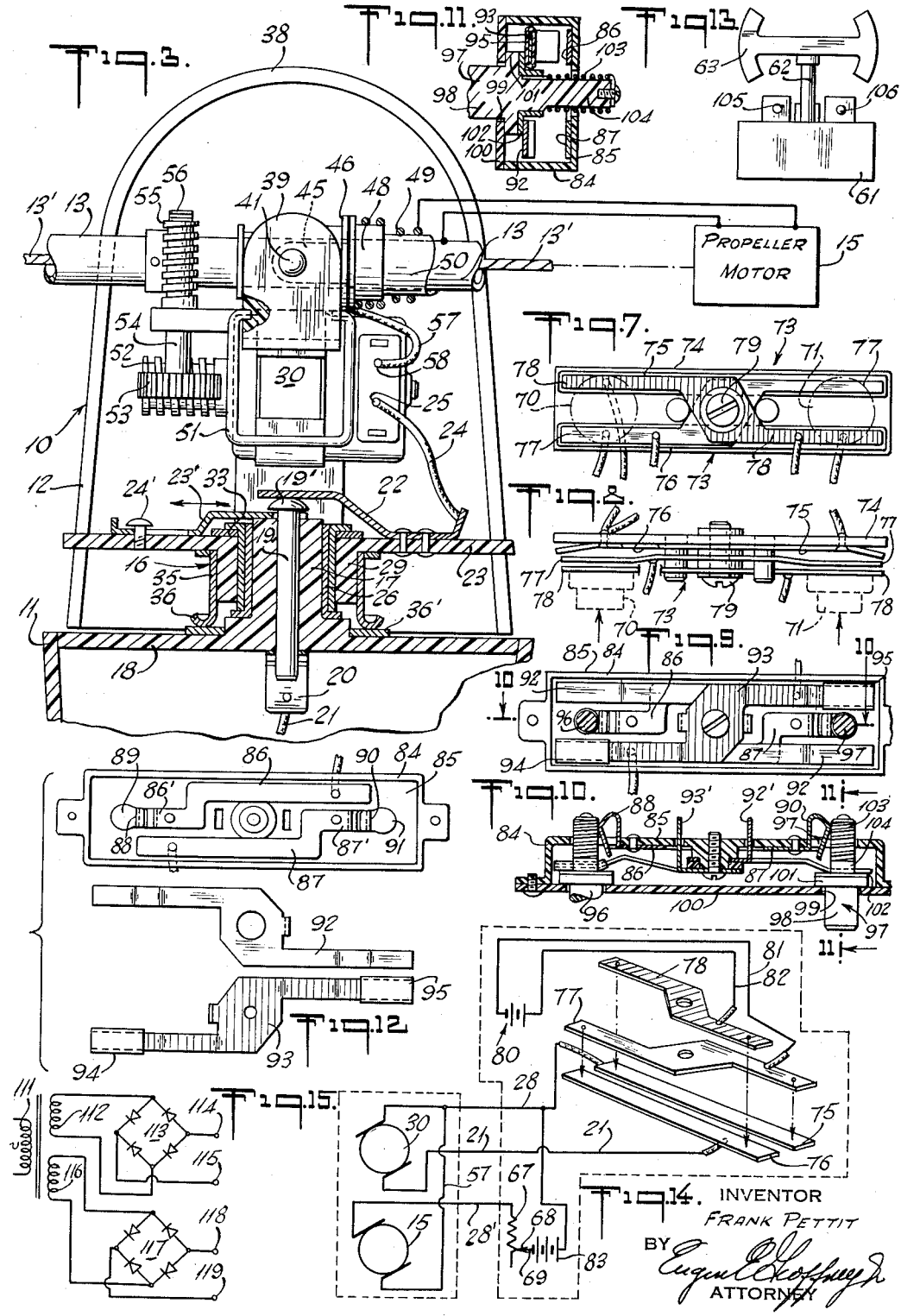
INVENTOR
FRANK PETTIT
BY
ATTORNEY United States Patent Office 2,967,706
Patented Jan. 10, 1961

2,967,706
TOY AIRCRAFT AND CONTROL THEREFOR
Frank Pettit, 696 Fairway Drive, Union, N.J.
Filed June 6, 1957, Ser. No. 663,934
9 Claims. (Cl. 272—31)

This invention relates to an electrical device and more specifically to a novel and improved tethered toy aircraft. It constitutes an improvement of my invention described in U.S. patent application Serial No. 647,834, filed March 22, 1957, entitled Airplane Toy and Control Therefor.

One object of this invention resides in the provision of a novel and improved tethered airplane control characterized by its relatively low cost, simplicity and ease of operation.

Another object resides in the provision of a novel and improved operating mechanism for tethered aircraft to simulate aerial maneuvers.

A still further object of the invention resides in a novel and improved control and switches therefor useful among other things for remotely controlling the operation of a tethered aircraft to simulate maneuvers of an actual aircraft.

The above and other objects and advantages of the invention will become more apparent from the following description and accompanying drawings forming part of the application.

In the drawings:

Fig. 1 is a perspective view of an airplane toy in accordance with one embodiment of the invention;

Fig. 2 is a cross sectional view of a portion of the pylon taken along the line 2—2 of Fig. 1;

Figs. 3 and 4 are cross sectional views of Fig. 2 taken along the lines 3—3 and 4—4 thereof;

Fig. 5 is a cross sectional view of the remote control for the toy of Fig. 1 taken along the line 5—5 thereof;

Fig. 6 is a cross sectional view of Fig. 5 taken along the line 6—6 thereof;

Figs. 7 and 8 are side views and plan views, respectively, of a reversing switch in accordance with the invention and forming part of the control shown in Figs. 1 and 5 for varying the pitch of the tethered aircraft in flight;

Fig. 9 is a plan view of a modified pitch control switch;

Fig. 10 is a cross sectional view of the switch shown in Fig. 9 taken along the line 10—10 thereof;

Fig. 11 is a cross sectional view of Fig. 10 taken along the line 11—11 thereof;

Fig. 12 is a plan view of individual switch elements shown in Figs. 9 and 10;

Fig. 13 is a side view of a modified control for controlling the flight of the aircraft as shown in Fig. 1; and Figs. 14 and 15 are circuit diagrams of the invention.

A toy is accordance with the invention is illustrated in Fig. 1 and comprises a central pylon generally denoted by the numeral 10 having a fixed base plate 11 and a rotatable upper section or turret dome 12. The turret dome carries a hollow rod or arm 13 having a simulated aircraft 14 pivotally attached to the outer end thereof and a drive motor 15 carried at the other end. The motor is coupled to the propeller 14' of the aircraft by means of a flexible shaft extending through the arm or tube 13 and functions as a counterbalance for the aircraft. As will be described, the arm 13 can be rotated about its own axis to change the pitch of the aircraft and the arm is movable in a vertical plane so that the altitude of the aircraft 14 can be increased or decreased by modifying its pitch. For a more detailed description of the general mode of operation of this invention, reference is made to my aforementioned application for U.S. patent.

Referring now to Figs. 2 and 3, the turret or rotatable dome 12 of the pylon 10 is mounted on the lower stationary section 11 by means of a central post or bearing assembly, generally denoted by the numeral 16 which affords, in addition to the mechanical support, means for transferring electrical circuits from the stationary section 11 to the dome 12 for the operation of the pitch control motor 30 and the propeller motor 15. More specifically the turret dome 12 comprises a turret plate 23 and a detachable cover or dome-like member carried by the turret plate. The turret plate 23 is carried by a vertically disposed cylindrical shaft or spindle 17 formed integrally with the transverse plate 18 of the stationary pylon part 11. The shaft member 17 is formed of an insulating material and has a metal pin 19 extending therethrough. The lower end of the pin includes a terminal 20 for the attachment of a wire 21. A spring contact 22 bears on the head 19' of the pin 19 and is riveted to a transverse turret plate 23 of insulating material forming part of the dome 12. The contact spring 22 is connected by a lead 24 to one terminal 25 of the pitch control motor 30.

A second circuit is completed to the dome 12 by providing the shaft or spindle 17 with a cover or bearing 26 of electrically conductive material that is cemented or otherwise secured thereto. This conductive cover or bearing is provided with an electrical terminal 27 secured thereto and extending through the plate 18. It is connected to the wire 28 for control of the motor 15 as will be described.

The dome 12 is provided with a tubular member 29 of insulating material located centrally of the dome and formed integrally with the turret plate 23. The cylindrical member 29 includes a metal sleeve 31 secured to the inner face thereof and having an inside diameter just slightly larger than the outer diameter of the bearing 26 for rotatable engagement with the bearing. The upper edge of the sleeve 31 includes an outwardly formed flange 32 which overlies a peripheral collar 33 forming part of an L-shaped metal bracket 34. The sleeve 31 and the metal bracket and collar assembly 34, 33 are electrically connected one to the other and are fixedly secured to the plate 23 of the turret dome 12. These elements together with the sleeve 26 form the second circuit into the dome 12.

The third or last circuit to the turret dome is accomplished by a collar 35 surrounding the cylindrical member 29 and having a hemispherical lower flange 36. The collar 35 is secured in place about the cylindrical member 29 and is electrically connected to a second L-shaped bracket 37 extending upward through the plate 33. The flange 36 rotatably engages a washer 36' secured to the plate 18 of the stationary pylon portion 11 and together form a thrust bearing for supporting the weight of the rotatable dome 12 and constitute the last electrical circuit from the lead 28' through the terminal 37' and thence to the L-shaped bracket member 37, as previously described.

The turret dome 12 is secured in rotatable engagement with the stationary pylon part 11 by means of a latch 23' slidably secured to the turret plate 23 by a rivet 24' or other suitable means. The inner end of the latch 23' is bifurcated and engages the upper end of pin 19 as may be observed more clearly in Fig. 3. To remove the dome 12, the cover is lifted from the turret plate 23 and the latch 23' withdrawn from engagement with pin 19.

The cover of the dome 12 has a centrally located vertical slot 38 for the reception and oscillation of the arm 13 which is carried by a trunnion block 39 formed of an insulating material. The block 39 is pivotally supported at the upper ends of the bracket members 34 and 37 by metal pins 40 and 41 extending through cooperating openings in the bracket. The block is centered between the brackets 34 and 37 by a pair of springs 34' and 37' that bear against the ends of the pins 41 and 40 and in addition, constantly urge the pins inwardly to contact cooperating electric circuit members.

The trunnion block 39 has an opening 42 extending therethrough for the receipt of the arm 13. At least a portion of the opening 42 is provided with a metal sleeve 43 for rotatably receiving the arm 13 and electrical energy is fed to the arm 13 via the pin 40, a spring 44 and the sleeve 43. Thus, the arm 13 constitutes one side of the electrical circuit to the motor 15, which is described more completely in my aforementioned application.

The second circuit to the motor 15 is completed through the pin 41, an L-shaped bracket member 45 having a washer-like collar 46 surrounding a tubular member 47 of insulating material and formed integrally with the block 39. The cylindrical member 47 has a surrounding sleeve 48 which is electrically connected and secured to the washer-like member 46 and carries one end of a spring 49. The spring 49 is insulated from the arm by a sheath 50 of insulating material and forms the other side of the circuit for energizing the motor 15. The motor 15 operates through the flexible cable 13' to propel the aircraft or helicopter, as the case may be. While a fixed wing aircraft is illustrated in the drawings, it is to be understood that the term "aircraft" as used herein comprehends both fixed wing aircraft as well as helicopters and other similar devices.

Rotation of the arm 13 to modify the pitch of the craft is accomplished by the motor 30 which is secured to the underside of the trunnion block 39 by a pair of spring loops 51. The motor carries a worm 52 which meshes with the worm gear 53 to drive a vertical shaft 54 rotatably supported by the block. The upper end of the vertical shaft 54 includes a worm 55 meshing with a worm gear 56 secured to the arm 13. Thus, operation of the motor in one direction or the other will impart rotation to the arm 13 about its longitudinal axis.

The electrical circuit within the pylon 10 is completed by a lead 57 connecting a terminal 58 of the motor 30 to the bracket member 45 within the block 39.

In this embodiment of the invention both the motors 15 and 30 are preferably D.C. motors having permanent magnet fields so that reversal of the polarity of the energy applied to the motors will reverse their direction of rotation.

With the invention thus far described, it is evident that by the application of energy between the terminals 28' and 28 the motor 15 will be energized to rotate the propeller 14' on the plane 14. Similarly, the application of energy to the leads 21 and 28' will effect rotation of the pitch control motor 30 and changing the polarity of the energy applied between the leads 21 and 28' will reverse the rotation of the motor 30.

Control of the motors 15 and 30 is effected by the remote control generally denoted by the numeral 60. This control includes a lower box or housing 61, a control lever or stick 62 and a simulated aileron wheel 63. The stick 62 extends through a slot 64 in the housing 61 and is pivoted to a bracket 65 within the housing by a pivot pin 66. The upper end of the bracket 65 carries a resistance element 67 and the stick 62 carries a spring loaded contactor 68 for cooperation with the element 67. When the stick 62 is moved to the left as in Figs. 1 and 6, the contactor 68 will leave the winding 67 to break the circuit between the leads 69 and 28', the circuit being from lead 69 to the bracket 65, thence through the pivot 66 to the stick 62, the contactor 68 and resistance element 67 to the lead 28'. This rheostat is connected in series with the energy motor 15 to control its speed and the specific circuit for the attainment of this end will be described in connection with Fig. 14.

In the embodiment of the invention shown in Figs. 1 and 5, the aileron wheel is provided with a pair of push buttons 70 and 71 for operating the motor 30 in one direction or the other, as the case may be. The transverse member 63' of the wheel 63 carries a reversing switch as shown more clearly in Figs. 7 and 8 in the drawings, and the four wires for connection of the reversing switch extend through the stick 62 and into the housing 61. For convenience, at this point in the description, these leads are all denoted by the single numeral 72.

The reversing switch is generally denoted in Figs. 7 and 8 by the numeral 73 and includes an insulated base plate 74 carrying two parallel strips 75 and 76 of conducting material that may be observed more clearly in Fig. 14. Overlying these strips are a pair of spring contactors generally denoted by the numerals 77 and 78. In order to distinguish between these contactors, the overlying contactor 78 has been cross hatched. The contactors 77 and 78 are secured to the insulated base plate 74 by a central screw 79.

In the operation of this switch when the button 70 is depressed, the left hand ends of the contact springs 77 and 78 are pressed downwardly to contact the strips 76 and 75, respectively. When the button 71 is depressed, the springs 77 and 78 contact the strips 77 and 76, respectively. Thus, the switch configuration of Figs. 7 and 8 is in effect a double-pole, double throw switch.

Referring now to Fig. 14, the pitch motor is energized by a battery generally denoted by the numeral 80 and is connected by leads 81 and 82 to the contact springs 77 and 78. The strip 75 of the switch is connected by lead 28 to both the flight motor 15 and the pitch motor 30. The strip 76 is connected to the pitch motor by lead 21. With this arrangement depression of one button will apply energy of one polarity to the motor 30 and depression of the other button will apply energy of the reverse polarity to the motor.

The flight motor is energized by batteries 83 connected by lead 69 to the rheostat 67—68 and thence through lead 28' to the other side of the flight motor 15. Thus, operation of the rheostat will control operation of the motor 15 and movement of the stick 62 will increase and decrease the speed thereof.

In certain cases it might be desirable to modify the rate of operation of the pitch control motor 30 and for this purpose a reversing switch as illustrated in Figs. 9 through 12 may be employed. In this embodiment of the invention, the switch is mounted within a housing 84 of insulating material. The base 85 of the housing is provided with a pair of contactors 86 and 87. The left end of the contactor 86 as observed in Fig. 12 includes an offset 86' to bring the left portion of the contactor in line with the center line of the housing 84 and the end is bent upon itself to provide a spring contactor 88 extending through the opening 89 in the housing base 85, as may be observed in Fig. 10. The second contacting strip 87 is similarly formed with an offset portion 87' and a spring contactor 90 extending through the opening 91. A pair of contact springs 92 and 93 overlie the strips 86 and 87 and are of S-shaped configuration. In order to distinguish the contact springs 92 and 93' from the other, the strip 93 has been sectioned in Fig. 9, and further includes insulating portions 94 and 95 on the ends thereof.

The push buttons generally denoted by the numerals 96 and 97 are identical and only the push button 97 will be described. This button has an outer cylindrical portion 98 extending through an opening 99 in a cover plate 100 for the housing 84. Within the housing there is a flange 101 which limits the outward travel of the button 97. On the inner side of the flange 101 there is an L-shaped collar 102 (see Fig. 11) of conductive material. This collar is electrically connected with one end of a resistance winding 103 carried on the cylindrical portion 104 of the push button which extends through the opening 97 in the base 85 of the housing. The winding 103 contacts the spring contactor 90 and as the push button is depressed, resistance will be removed from the circuit since the button slides relative to the contactor 90 until the free end of the contactor 90 actually engages the metal collar 102.

In the operation of this switch, electrical energy is fed to the strips 86 and 87 fixed to the base 85 of the housing 84. When the push button 97 is depressed, the right hand end of the strip 93 is moved downwardly into contact with the strip 86. The collar 102 on the push button is connected to the strip 87 through the resistance winding 103 and the spring contact 92 which bears against the collar 102 and energy for application to the motor appears at terminals 93' and 92'. To reverse the polarity of the energy on the terminals 92' and 93', the button 96 is depressed. This moves the left hand end of the spring contactor 93 into engagement with the strip 87 and the left hand end of the spring contactor 92 is coupled to the strip 86 by the collar 102 and resistance element of the push button. Thus, with the switch as described, depression of either push button first completes the circuit and further depression removes more and more resistance from the circuit to increase the speed of the motor 30.

Switches in accordance with either of the embodiments of the invention shown in Figs. 7 to 12, inclusive, may be utilized in connection with the aileron wheel as described. If desired, suitable reversing switches may be mounted directly on the housing 61 as shown in the modified embodiment of the control illustrated in Fig. 13. In this case the push buttons denoted by the numerals 105 and 106 are disposed on either side of the stick 62 and avoid the need for inserting switch wiring through the center of the stick 63.

If desired, the toy in accordance with the invention may be operated from an alternating source in the manner shown in Fig. 15 of the drawings. For this purpose a transformer 110 is utilized having a primary 111 connected to an A.C. outlet or other alternating current supply. A first secondary 112 is connected to a full wave rectifier 113 and the rectified output is applied to terminals 114 and 115 which are connected to leads 81 and 82 of Fig. 14 in place of the battery 80. Thus the winding 112 will supply energy to the pitch motor 30. The flight motor 15 is energized by a second secondary winding 116 connected through the full wave rectifier 117 to terminals 118 and 119 which are connected to leads 28 and 69 of Fig. 14 in place of battery 83. It is to be understood that either A.C. or battery operation of the toy may be employed or the control housing 61 may include the batteries and plug means for connecting the apparatus of Fig. 15 and automatically disconnecting the batteries 80 and 83. If rechargeable batteries are used, they may remain in circuit with the apparatus of Fig. 15 in which case it may be desirable to utilize protective means for the batteries to preventing overcharging.

While only certain embodiments of the invention have been described, it is apparent that modifications, alterations and changes may be made without departing from the true scope and spirit of the present invention and as defined by the appended claims.

What is claimed is:

1. In a tethered aircraft toy having a pylon, an arm removably carried by said pylon for rotation about its longitudinal axis and movement through both horizontal and vertical planes and a tethered aircraft including a rotary propelling member carried by said arm, means for operating said aircraft comprising an electric motor coupled with said propelling member, a second electric motor carried by said pylon, speed reducing gearing constantly coupling said second motor with said arm for controlling rotation of said arm about its own axis, a control stick including a rheostat mechanically coupled therewith and connected with said first mentioned motor for controlling the magnitude of current through said motor, and switch means including at least two control members therefor connected with said second motor for selectively controlling the direction of rotation thereof.

2. In a tethered aircraft toy having a pylon, an arm carried by said pylon for rotation about its longitudinal axis and movement through both horizontal and vertical planes and a tethered aircraft including a rotary propelling member carried by said arm, means for operating said aircraft comprising an electric motor coupled with said propelling member, a second electric motor carried by said pylon, means coupling said second motor with said arm for rotation of said arm about its own axis, a control stick including a rheostat mechanically coupled therewith and connected with said first mentioned motor for controlling the magnitude of current through said first mentioned motor, and switch means including at least two control members therefor connected with said second motor for selectively controlling the direction of rotation thereof, said control members for said switch means comprising two push buttons for selectively operating said switch means, and individual rheostats associated with said buttons for controlling the speed of operation of said second motor in the selected directions of operation.

3. In a tethered aircraft toy according to claim 1 wherein said control stick is supported for arcuate movement in a vertical plane and includes a cross member, and said switch means and control members therefor are carried by said cross member.

4. In a tethered aircraft toy according to claim 1 wherein said control stick is supported for arcuate movement in a vertical plane and includes a transverse member simulating an aircraft aileron control of a real aircraft and said operating members for said switch means are positioned in close proximity to said stick.

5. In a tethered aircraft toy having a pylon, an arm carried by said pylon for rotation about its longitudinal axis and movement through both horizontal and vertical planes and a tethered aircraft including a rotary propelling member carried by said arm, means for operating said aircraft comprising an electric motor coupled with said propelling member, a second electric motor carried by said pylon, means coupling said second motor with said arm for rotation of said arm about its own axis, a control stick including a rheostat mechanically coupled therewith and connected with said first mentioned motor for controlling the magnitude of current through said first mentioned motor, and switch means including at least two control members therefor connected with said second motor for selectively controlling the direction of rotation thereof, said control members for said switch means comprising a pair of elongated push buttons, each of said buttons including a resistance element, stationary contact means cooperating with said element and in circuit with the switch whereby depression of each button will close the associated motor circuit and further depression will decrease the resistance in the motor circuit and increase the speed of the motor.

6. In a tethered aircraft toy having a pylon, a member carried by said pylon and freely rotatable about a vertical axis relative to the pylon, a pair of upwardly extending supports carried by said member in spaced, substantially parallel relationship, a block having an opening therethrough and removably journalled to said supports for angular movement relative thereto, an aircraft supporting arm extending through and rotatably carried by said block, individual motive means carried by said arm for propelling said aircraft about the pylon, second motive means carried by said block and angularly movable with said block, a first gear fixedly secured to said arm, a second gear driven by said second motive means, gear means in constant coupling with the first and second gears whereby rotation of the second motive means will effect rotation of the arm about its own axis and de-energization of the last said motive means will prevent rotation of the arm about its own axis and means for selectively energizing both said motive means and for effecting rotation of said second motive means in either direction.

7. In a tethered aircraft toy having a pylon, a member rotatably carried by said pylon, a pair of upwardly extending supports carried by said member in spaced relationship, a carrier member journalled to said supports for angular movement relative thereto, an aircraft supporting arm rotatably carried by said carrier member, individual motive means carried by the arm for propelling said aircraft about the pylon, second motive means carried by said carrier member and angularly movable with said carrier member, a first gear fixedly secured to said arm, a second gear driven by said second motive means, gear means in engagement with the first and second gears whereby rotation of the second motive means will effect rotation of the arm about its own axis and deenergization of the last said motive means will prevent rotation of the arm about its own axis and means selectively energizing both said motive means for effecting rotation of said motive means in other directions.

8. In a tethered aircraft toy having a pylon, a member rotatably carried by said pylon, electric current conducting means between said pylon and rotatably carried member for conducting electric power from the pylon to said rotatable member, a pair of upwardly extending supports carried by said member in spaced relationship, a carrier member journaled to said supports for angular movement relative thereto, an aircraft supporting arm rotatably carried by said carrier member, individual motive means carried by the arm for propelling said aircraft about the pylon, second motive means carried by said carrier member and angularly movable with said carrier member, a first gear fixedly secured to said arm, a second gear driven by said second motive means, gear means in engagement with the first and second gears whereby rotation of the second motive means will effect rotation of the arm about its own axis and deenergization of the last said motive means will prevent rotation of the arm about its own axis and means selectively energizing both said motive means for effecting rotation of said motive means in other directions, said electric current conducting means between the pylon and the rotatably carried member comprising a vertically disposed cylindrical member carried by the pylon, a bearing of conductive material fixed to and carried by said cylindrical member, a tubular member of insulating material carried by said rotatable member, a metallic liner in said tubular member for rotatably engaging said bearing, a washer-like ring of metallic material surrounding said cylindrical member and secured to said pylon, means carried by said rotatable member for slidably engaging said conductive ring, a pin of conducting material extending through said cylindrical member, and a spring member of conductive material carried by said rotatable member and bearing against said pin whereby electric power for selective operation of said motive means is transmitted from said pylon to said rotatably carried member, and whereby said rotatably carried member may be readily engaged and disengaged from said pylon.

9. In a tethered aircraft toy according to claim 8 wherein said pin is fixedly secured to said cylindrical member and has a head portion spaced from the upper surface of said cylindrical member, and said rotatable member includes a releasable latch for engaging the pin between said head and the upper surface of the cylindrical member to fixedly secure the rotatable member to said pylon while permitting it to rotate freely relative thereto.

References Cited in the file of this patent

UNITED STATES PATENTS

| | | |
|---|---|---|
| 2,259,792 | Batcheller | Oct. 21, 1941 |
| 2,426,259 | Christiansen | Aug. 26, 1947 |
| 2,469,924 | Kunz | May 10, 1949 |
| 2,676,014 | Smith | Apr. 20, 1954 |
| 2,684,411 | Verkuil | July 20, 1954 |
| 2,699,334 | Pettit | Jan. 11, 1955 |
| 2,725,669 | Vincent | Dec. 6, 1955 |
| 2,736,133 | Carpenter | Feb. 28, 1956 |
| 2,779,595 | Ensley | Jan. 29, 1957 |
| 2,806,907 | Mazzola | Sept. 17, 1957 |